(12) United States Patent
Elizondo

(10) Patent No.: US 8,505,465 B2
(45) Date of Patent: Aug. 13, 2013

(54) RAILWAY TRUCK

(75) Inventor: Juan Carlos Elizondo, Brampton (CA)

(73) Assignee: Lanza Projects Corporation (CA)

( * ) Notice: Subject to any disclaimer, the term of this patent is extended or adjusted under 35 U.S.C. 154(b) by 0 days.

(21) Appl. No.: 13/380,405

(22) PCT Filed: Jun. 25, 2010

(86) PCT No.: PCT/CA2010/000958
§ 371 (c)(1),
(2), (4) Date: Dec. 22, 2011

(87) PCT Pub. No.: WO2010/148495
PCT Pub. Date: Dec. 29, 2010

(65) Prior Publication Data
US 2012/0103228 A1   May 3, 2012

(30) Foreign Application Priority Data

Jun. 26, 2009  (CA) .................... 2668966

(51) Int. Cl.
*B61D 1/00*  (2006.01)
(52) U.S. Cl.
USPC ...... 105/168; 105/165; 105/215.1; 105/215.2
(58) Field of Classification Search
USPC .................. 105/141, 165, 215.1, 215.2, 167, 105/168, 72.2, 34.1
See application file for complete search history.

(56) References Cited

U.S. PATENT DOCUMENTS

| 4,067,261 | A | * | 1/1978 | Scheffel | 105/168 |
| 4,134,343 | A | * | 1/1979 | Jackson | 105/167 |
| 4,136,620 | A | * | 1/1979 | Scheffel et al. | 105/168 |
| 4,237,791 | A | * | 12/1980 | Jackson et al. | 105/168 |
| 4,300,454 | A | * | 11/1981 | Scheffel | 105/168 |
| 4,429,637 | A | * | 2/1984 | Jackson et al. | 105/168 |
| 4,480,553 | A | * | 11/1984 | Scheffel | 105/167 |
| 4,570,544 | A | * | 2/1986 | Smith | 105/165 |

(Continued)

FOREIGN PATENT DOCUMENTS

EP 0161729 A1  11/1985
EP 1637425 A2   3/2006

OTHER PUBLICATIONS

International Search Report and Written Opinion of the International Searching Authority for PCT/CA2010/000958 (in English), mailed Oct. 15, 2010; ISA/CA.

(Continued)

*Primary Examiner* — Jason C Smith
(74) *Attorney, Agent, or Firm* — Harness, Dickey & Pierce, P.L.C.

(57) ABSTRACT

A railway truck is provided comprising first and second wheelsets, each wheelset comprising at least a left and a right wheel adjacent opposite ends of an axle. Each axle is supported for rotation about an axle axis by a respective bearing adjacent the left and right wheels. A first frame member extends between a bearing support adjacent the left wheel of the first wheelset and a bearing support adjacent the right wheel of the second wheelset. A second frame member extends between a bearing support adjacent the left wheel of the second wheelset and a bearing support adjacent the right wheel of the first wheelset. The first and second frame members are free to move without interference from each other to cause the truck to steer in response to a change in a rolling direction of either of the first and second wheelsets.

8 Claims, 12 Drawing Sheets

(56) References Cited

U.S. PATENT DOCUMENTS

| | | | |
|---|---|---|---|
| 5,243,920 A * | 9/1993 | Lamson et al. | 105/165 |
| 5,461,986 A * | 10/1995 | Sarnicki et al. | 105/165 |
| 6,910,426 B2 * | 6/2005 | Krishnaswami | 105/167 |
| 8,074,577 B2 * | 12/2011 | Morichika et al. | 104/139 |
| 2011/0265683 A1 * | 11/2011 | Kurahashi et al. | 105/215.2 |
| 2011/0271868 A1 * | 11/2011 | Kurahashi et al. | 105/141 |
| 2012/0031298 A1 * | 2/2012 | Kurahashi et al. | 105/215.2 |
| 2012/0037031 A1 * | 2/2012 | Okubo et al. | 105/167 |
| 2012/0103228 A1 * | 5/2012 | Elizondo | 105/141 |

OTHER PUBLICATIONS

International Preliminary Report on Patentability (Chapter I of the Patent Cooperation Treaty) for PCT/CA2010/000958, issued Jan. 4, 2012.

* cited by examiner

RAILWAY TRUCK

CROSS-REFERENCE TO RELATED APPLICATIONS

This application is a U.S. National Stage Application of International Application No. PCT/CA2010/000958, filed Jun. 25, 2010 and published in English as WO/2010/148495 on Dec. 29, 2010. This application claims priority to Canadian Application No. 2,668,966, filed Jun. 26, 2009. The entire disclosures of the above applications are incorporated herein by reference.

FIELD OF INVENTION

The present invention relates generally to rail transport. More specifically the present invention relates to railway trucks ("bogies") for supporting railcars.

BACKGROUND OF INVENTION

Railway cars, including streetcars and subway cars traditionally ride on a pair of parallel rails. The rails are engaged by respective wheels of a railway truck.

Traditional railway trucks include a pair of generally parallel sideframes connected by a transversely extending bolster. The bolster supports an overlying railway car.

In a traditional railcar the wheels are rigidly secured to opposite ends of an axle in an assembly referred to as a "wheelset". The railway truck typically has a pair of generally parallel wheelsets and the railway truck maintains the wheelsets in the generally parallel configuration.

A first disadvantage of traditional railcars is the requirement of having a pair of rails which much be maintained in a generally parallel spaced apart relationship. This arrangement is capital and labour intensive.

A further disadvantage of traditional railcars is their inability to steer given that the wheelsets are supported with their respective axles generally parallel. Although the railway truck may swivel relative to an overlying railcar, the wheelsets remain in a fixed alignment. Accordingly the wheels generally align poorly with railway tracks in corners causing slippage between the wheels and the tracks which causes the characteristic squeal of subway cars and streetcars in negotiating corners and as well damage to the tracks arising from the slippage.

It is an object of the present invention to provide a railway truck and a rail system which overcomes at least some of the problems set out above with traditional railcar and railway systems.

SUMMARY OF THE INVENTION

According to one aspect of the present invention, a railway truck is provided comprising first and second wheelsets, each wheelset comprising at least a left and a right wheel adjacent opposite ends of an axle, the left and rights wheels of the first and second wheelsets respectively are alignable to follow a common path. Each axle is supported for rotation about an axle axis by a respective bearing adjacent the left and right wheels. Each bearing is supported in a respective bearing support. A first frame member extends between the bearing support adjacent the left wheel of the first wheelset and the bearing support adjacent right wheel of the second wheelset. The first frame member is swivelably coupled to the bearing support for rotation about an axis orthogonal to the axle axis. A second frame member extends between the bearing support adjacent the left wheel of the second wheelset and the bearing support adjacent the right wheel of the first wheelset. The second frame member is swivelably coupled to the bearing supports for rotation about an axis orthogonal to the axle axis. The first and second frame members are free to move without interference from each other to cause the left and right wheels respectively to move toward or away from each other in response to movement in the opposite direction by the other of the left and right wheels to cause the truck to steer in response to a change in a rolling direction of either of the first and second wheelsets.

According to another aspect of the present invention, a streetcar is provided, comprising a railway truck, as defined herein, at opposite ends thereof; at least one motor coupled to at least one of the wheelsets for driving the wheelset; a motor control means for controlling the driving of the wheelset by the motor; and a power receptor mounted to the streetcar for receiving electricity from a source of electricity, the power receptor being electrically coupled to the at least one motor through the motor control means.

BRIEF DESCRIPTION OF DRAWINGS

A detailed description of the invention is set out below with reference to the accompanying illustrations in which.

DESCRIPTION OF PREFERRED EMBODIMENTS

Figure 1:
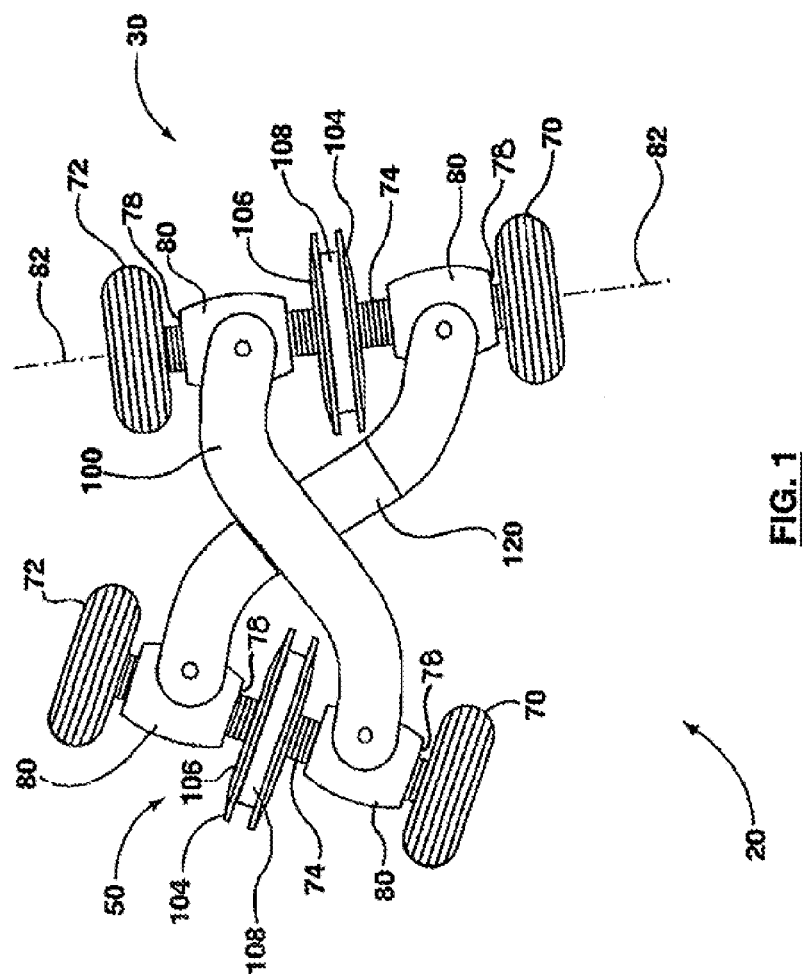
FIG. 1 is a plan view of a railway truck according to the present invention.

A railway truck according to the present invention is generally indicated by reference numeral 20 in the accompanying illustrations. The railway truck 20 has a first wheelset 30 and a second wheelset 50. As the first and second wheelsets 30 and 50 are virtually identical, common reference numerals are used herein for their component parts. Each of the first and second wheelsets 30 and 50 respectively has a respective left wheel 70 and right wheel 72 adjacent opposite ends of an axle 74. The left wheel 70 and right wheel 72 are alignable, as set out in more detail below to follow a common path defined either by a spaced apart pair of conventional parallel railroad tracks (not shown) or a single monorail track 90.

Each axle 74 is supported for rotation about an axle axis 82 by a respective bearing 78 adjacent each of the left and right wheels 70 and 72 respectively. Each bearing 78 is supported in a respective bearing support 80.

A first frame member 100 extends between the bearing support 80 adjacent the left wheel 70 of the first wheelset 30 and the bearing support 80 adjacent the right wheel 72 of the second wheelset 50. The bearing supports 80 are swivelably coupled to the first frame member 100 for rotation about an axis 102 (shown in dashed lines in FIG. 3) orthogonal to the axle axis 82 about which the left wheel 70 and right wheel 72 are rotatable. The left wheel 70 and right wheel 72 may each be a rim shod with a tyre of rubber or other suitable material for engaging a road surface 94.

In like manner, a second frame member 120 extends between the bearing support 80 adjacent the left wheel 70 of the second wheelset 50 and the bearing support 80 adjacent the right wheel 72 of the first wheelset 30. The second frame member 120 is swivelably coupled to the bearing supports 80 for rotation about an axis 102 orthogonal to the axle axis 82. The axis 82 is shown as a dashed line in FIG. 1. Both of the frame members are contoured to allow a crossover of the first and second frame members without interference therebetween.

Either or both of the first and second frame members 100, 120 may support a portion of an overlying rail car. Typically some form of bearing would be interspersed between the first and second frame members 100 and 120 respectively and the rail car to enable the railway truck 20 swivel relative to the railcar.

The left wheel 70 and right wheel 72 are road engaging wheels for riding on a road surface 94, with the guiding wheel 104 being a rail engaging wheel configured to straddle a monorail track 90 to guide the wheelsets 30, 50 and in turn to guide the railway truck 20. The guiding wheels 104 ride along a monorail and the left wheel 70 and right wheel 72 provide additional support on the left and right side of the railway truck 20.

Guiding wheels 104 have a track engaging surface 108 extending circumferentially thereabout between opposing flanges 106. The flanges 106 are spaced apart and extend radially outwardly beyond the track engaging surface 108 to define in conjunction with the track engaging surface 103 a channel for receiving the track. The channel 108 receives and rides on a monorail track 90 with the flanges 106 engaging opposite sides of the monorail track 90 to maintain the track engaging surface 108 thereon. The track engaging surface 108 is preferably a flat surface.

Figure 2:
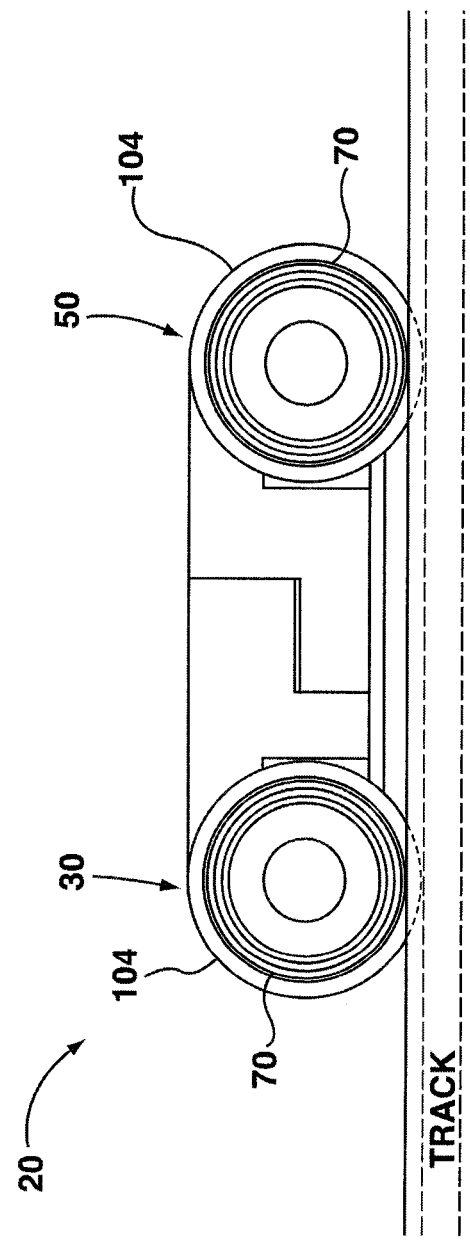
FIG. 2 is a side elevation corresponding to FIG. 1.
Figure 3:
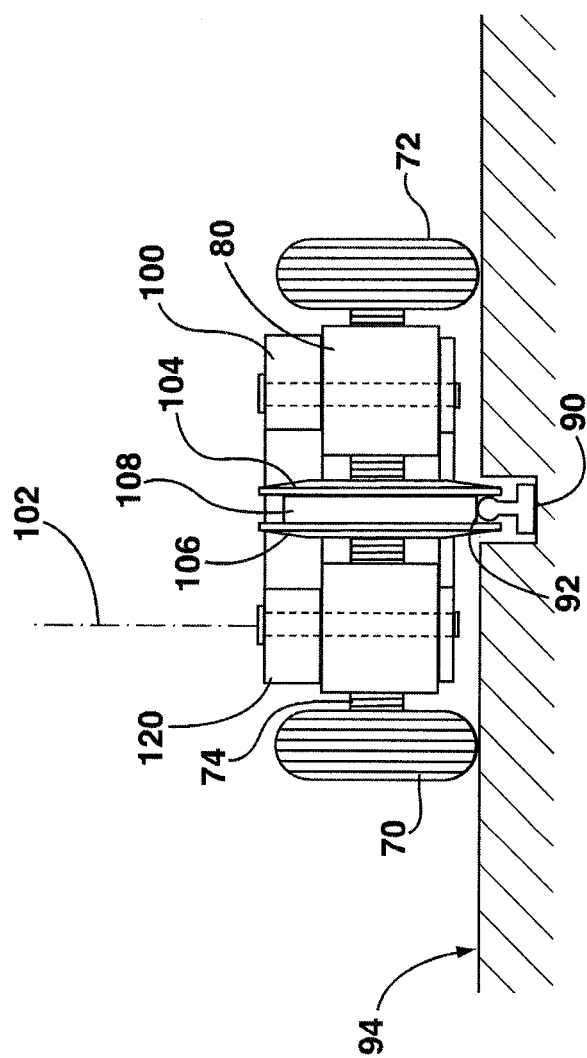
FIG. 3 is an end view corresponding to FIG. 1.

The guiding wheel 104 may have a diameter which is as great or greater than the diameter of the left and right wheels 70, 72 so that the guiding wheel 104 engages the monorail track 90 when the monorail track 90 is embedded in a road surface 94. The diameter of the guiding wheel 104 (including the flanges 108) in this embodiment is larger than the diameter of the left and right wheels 70. Accordingly the guiding wheel extends below the road surface to engage the monorail 90 as shown in FIGS. 2 and 3. The track engaging surface 108 is sized to engage the upper surface 92 of the monorail 90 and the flanges 106 maintain the guiding wheels 104 on the monorail track 90.

Embedding the monorail track 90 into the underlying surface is a preference where the underlying surface is to be shared with other vehicles such as cars. In situations where this is not the case the monorail track 90 may be placed on the underlying surface to extend above it such as illustrated in FIGS. 7 through 10.

Figure 4:
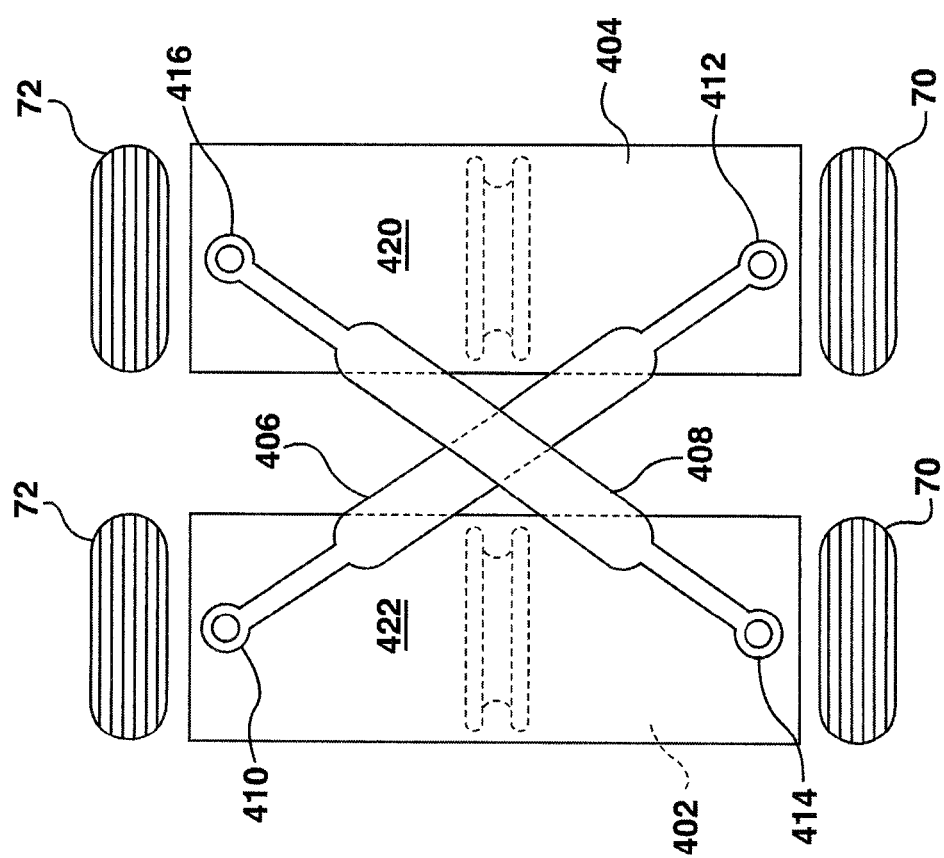
FIG. 4 is a plan view of an exemplary embodiment of a railway truck according to the present invention.

In another embodiment, as shown in FIG. 4, a first housing 402 attaches to the first wheelset 30 along the axis between the left and right wheels 70, 72. Similarly, a second housing 404 attaches to the second wheelset 50 along the axis between the left and right wheels 70, 72. A substantially straight first scissor bar 406 extends from the portion of the upper surface 422 of the first housing 402 near the right wheel 72 of the first wheelset 30 to the portion of the upper surface 420 of the second housing 404 near the left wheel 70 of the second wheelset 50. The scissor first and second bars 406 and 408 respectively are analogous to the first and second frame members 100 and 120 in the FIGS. 1-3 embodiment. The housings 402 and 404 are analogous to the bearing supports 80 except that each housing supports two bearings and therefore acts as a pair of bearing supports.

Similarly, a substantially straight second scissor bar 408 extends from the portion of the upper surface 422 of the second housing 404 near the left wheel 70 of the second wheelset 50 to the portion of the upper surface 420 of the first housing 404 near the right wheel 72 of the first wheelset 30.

The first scissor bar 406 has a first end 410 pivotally attached to the portion of the upper surface 422 of the first housing 402 near the right wheel 72 of the first wheelset 30. The first scissor bar 406 has a second end 412 pivotally attached to the portion of the upper surface 420 of the second housing 404 near the left wheel 70 of the second wheelset 50.

Similarly, the second scissor bar 408 has a first end 414 pivotally attached to the portion of the upper surface 422 of the first housing 402 at near the left wheel 70 of the first wheelset 30. The second scissor bar 408 also has a second end 416 pivotally attached to the portion of the upper surface 420 of the second housing 404 near the right wheel 72 of the second wheelset 50.

Figure 5:
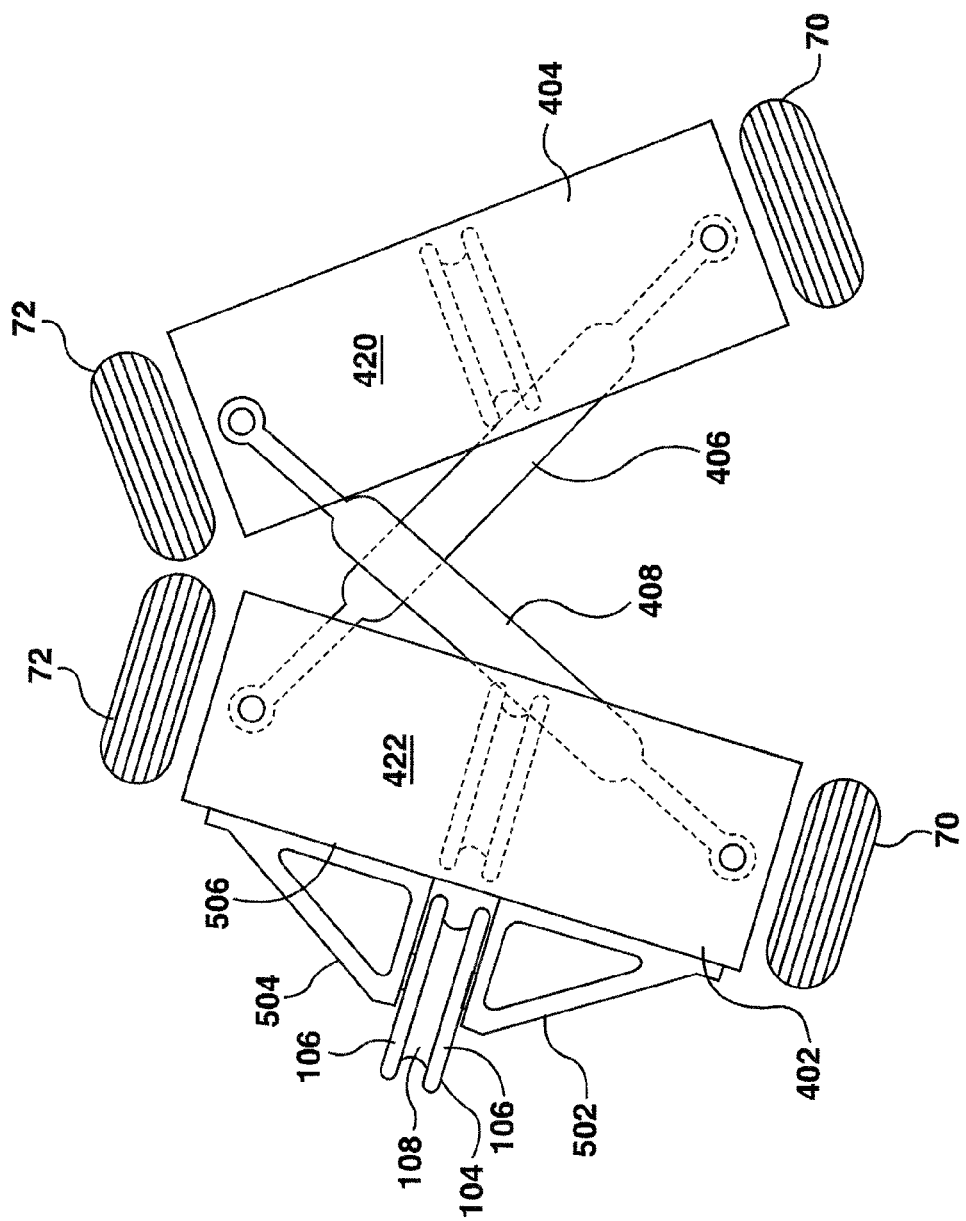
FIG. 5 is a plan view of an exemplary embodiment of a railway truck according to the present invention.

In an alternative embodiment, shown in FIG. 5, the scissor bars 408, 406 may be pivotally connected as in the above embodiment with the exception that they are pivotally connected to the lower surface of the first and second housing 402, 404, which is opposite the upper surface 422, 420.

In the embodiment shown in FIG. 5, a left extension member 502 and a right extension member 504 project from the front edge 506 of the first housing 402. The left extension member 502 and the right extension member 504 have an axle (not shown) projecting therebetween. A front guiding wheel 104 rotationally mounts onto the axle that projects between the left extension member 502 and the right extension member 504. The front guiding wheel 104 is aligned with the guiding wheel 104 underneath the first housing 402 for riding on a monorail track 90.

The pivotal attachment of the first and second scissor members 406, 408 allows the first and second wheelsets 30, 50 to pivot independently relatively to each other. When the first wheelset 30 pivots with respect to the second wheelset 50 along a surface plane, for example, the scissor members 406, 408 pivot on the first and second housing 402, 404, respectively. Thus, the first housing 402 and first wheelset 30 may pivot between a fully turned position as shown in FIG. 5 and a straight position as shown in FIG. 4.

Figure 6:
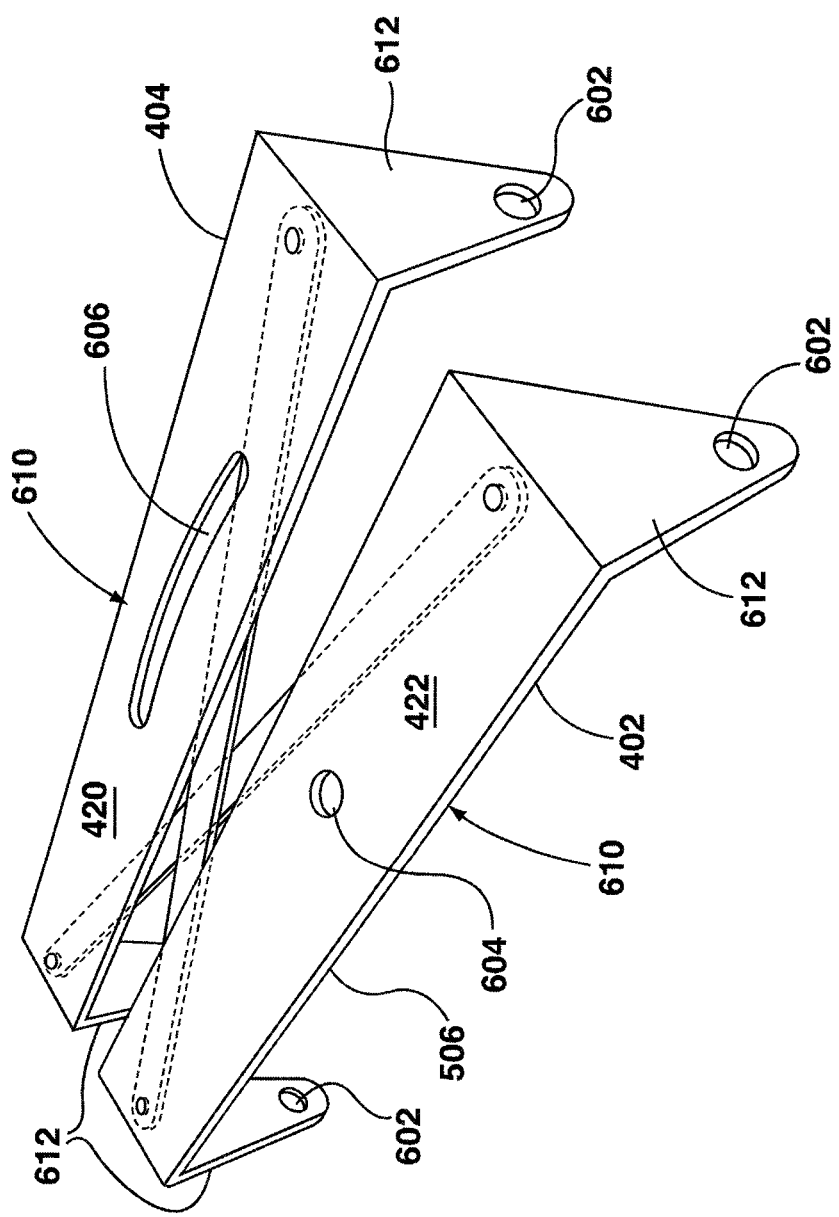
FIG. 6 is a perspective view of two housings according to the present invention.

FIG. 6 shows a close-up of the first and second housing 402, 404. Each of the first and second housings 402, 404 have a main portion with a top plate 610 having an upper planar surface 420, 422 with side flanges 612 extending from opposing two ends of the top plate 610 in the same direction, which is perpendicular to the top plate 610. Each of the side flanges 612 has an aperture 602 through which the axle 74 passes when connected to the left and right wheels 70, 72. There is a singular aperture 604 through the planar surface of the first housing 402 for receiving an attachment mechanism from a load bearing device, such as a streetcar or truck. The planar surface of the second housing 404 has an extended aperture 606 for slidably engaging with an attachment element of the load bearing device.

Figure 7:
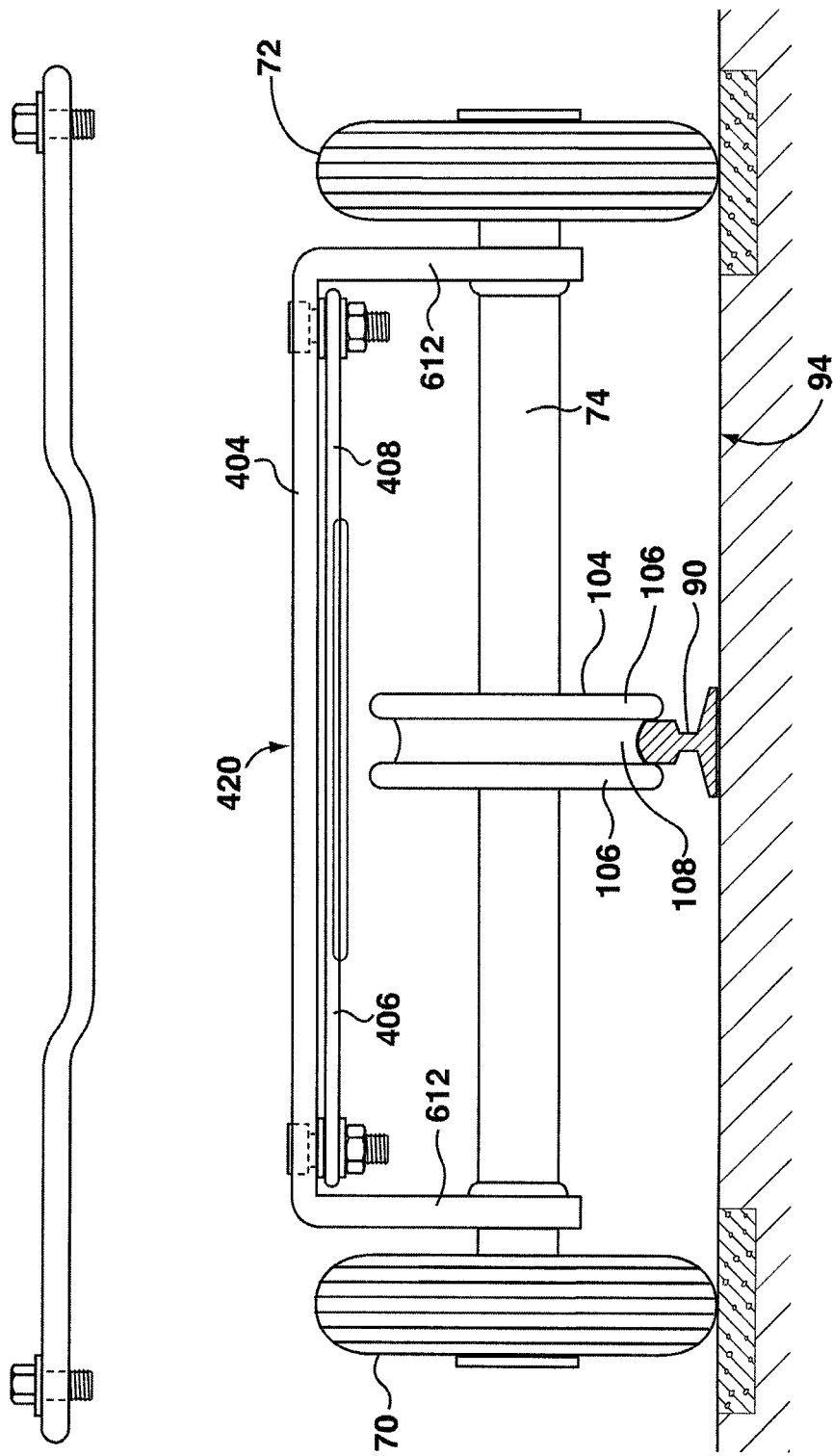
FIG. 7 is an end view of a railway truck according to the present invention.

FIG. 7 shows the second housing 404 attached to the axle 74 of the second wheelset 50. As shown, the scissor bars 408, 406 are pivotally attached by a bolt and nut to the underside of the housing 40.

Figure 8:
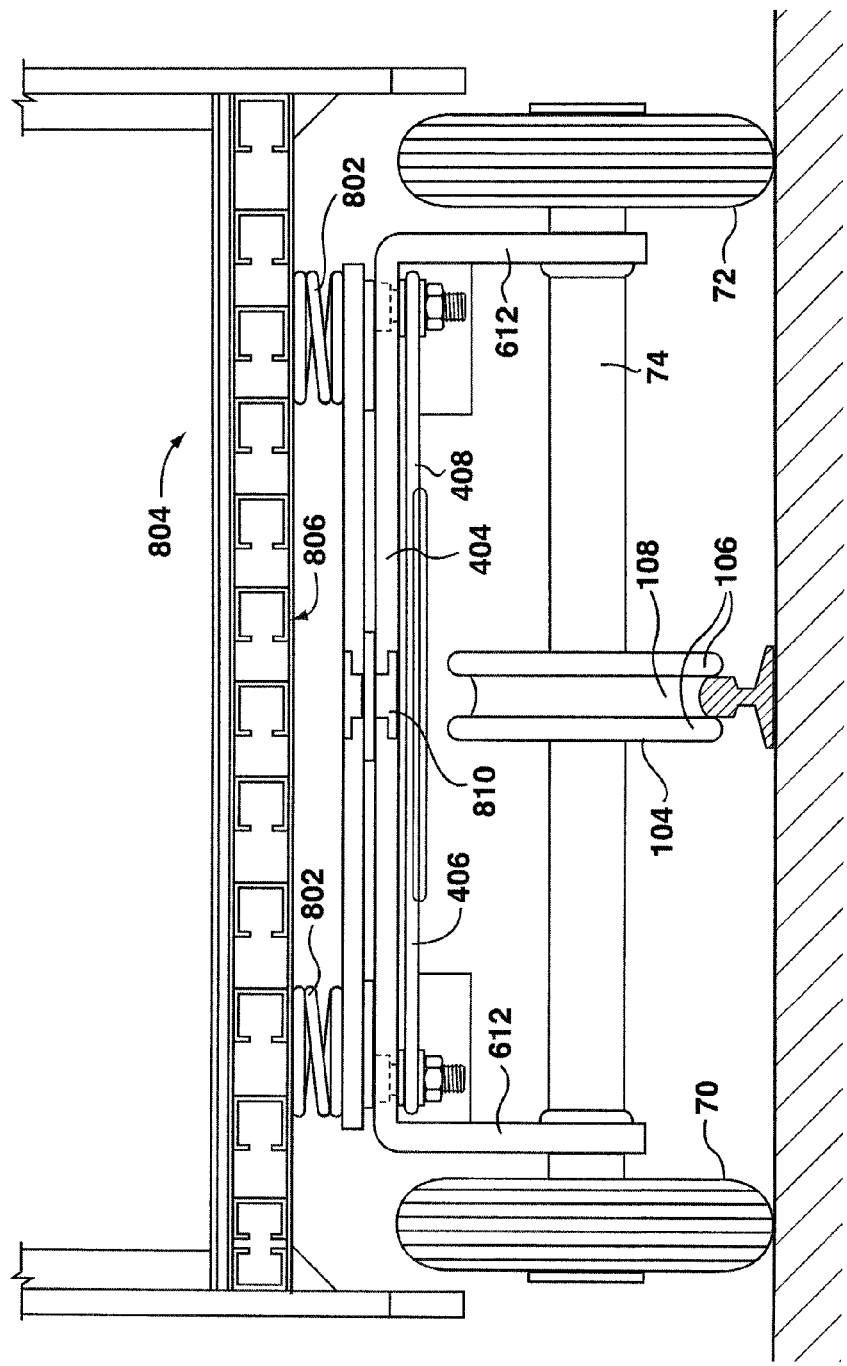
FIG. 8 is an end view of a streetcar mounted on a railway truck according to the present invention.

FIG. 8 shows a streetcar 804 attached to the second housing 404. An attachment element 810 extends from the bottom surface 806 of the streetcar 804 and slidably engages with the extended aperture 606. There are two suspension coils 802 on either side of the second housing 404 abutting and engaging the bottom surface 806 of the streetcar 804. The suspension coils 802 support the streetcar 804.

A motor (not shown) may be operatively connected to the guiding wheel 104 for driving the streetcar 804 along the monorail 90.

Figure 9:
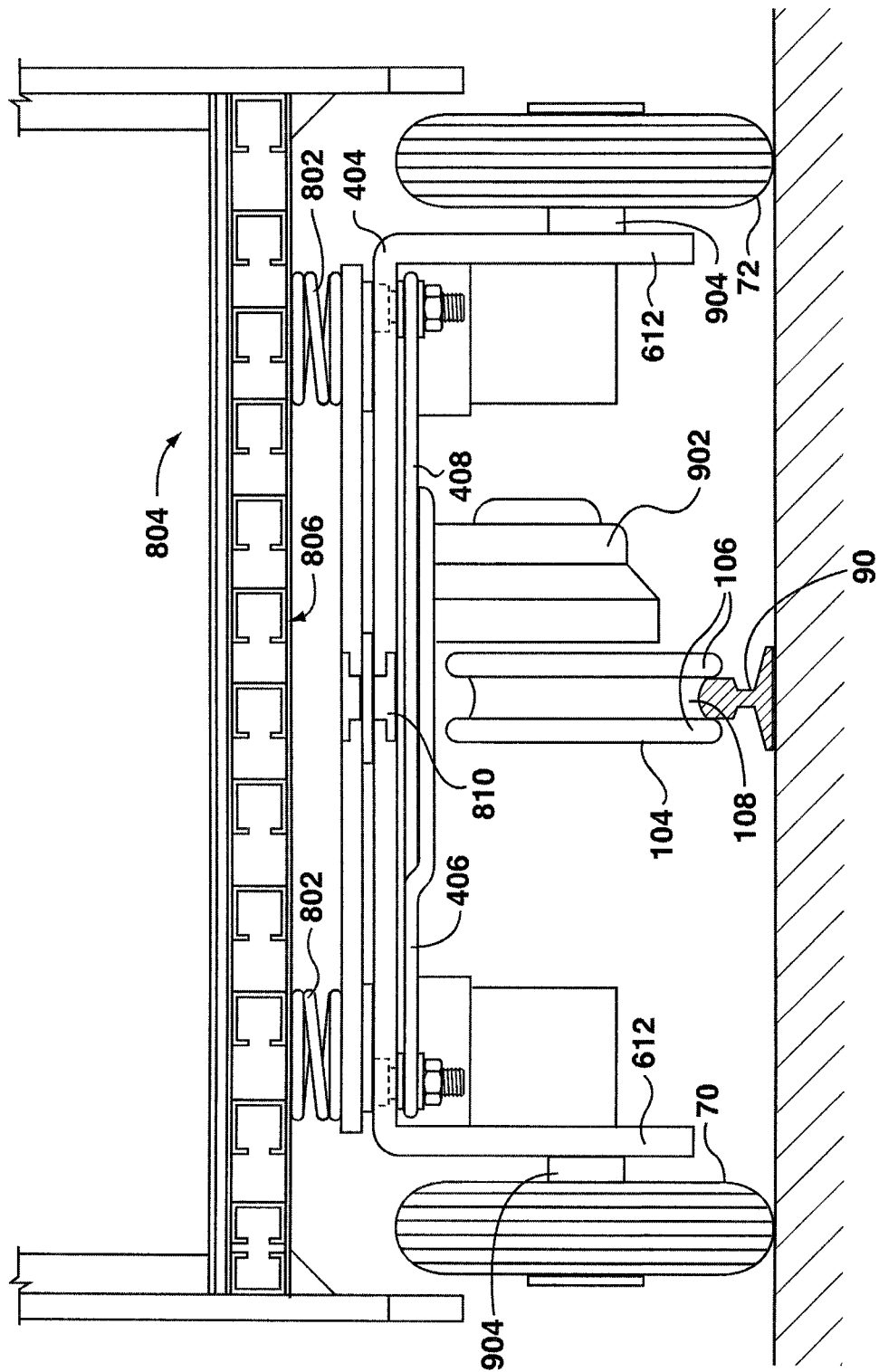
FIG. 9 is an end view of a streetcar mounted on an alternate embodiment of a railway truck according to the present invention.

In a further embodiment, depicted in FIG. 9, the first wheelset 30 may not have an axle 74 extending from the left wheel 70 to the right wheel 72. The left wheel 70 may be connected to a flange 612 of the housing 404 by a rotatable member 904. Similarly the right wheel 72 may be connected to another flange 612 of the housing 404 by a rotatable member 904. The rotatable members 904 are attached to the housing 404 and the left and right wheels 70, 72, to allow the left and right wheels 70, 72 to rotate around their respective central axes. Similarly a motor 902 may extend from the central portion of the housing 404 and rotatably engage the guiding wheel 104 so that the guiding wheel 104 may rotate around its central axis.

Figure 10:
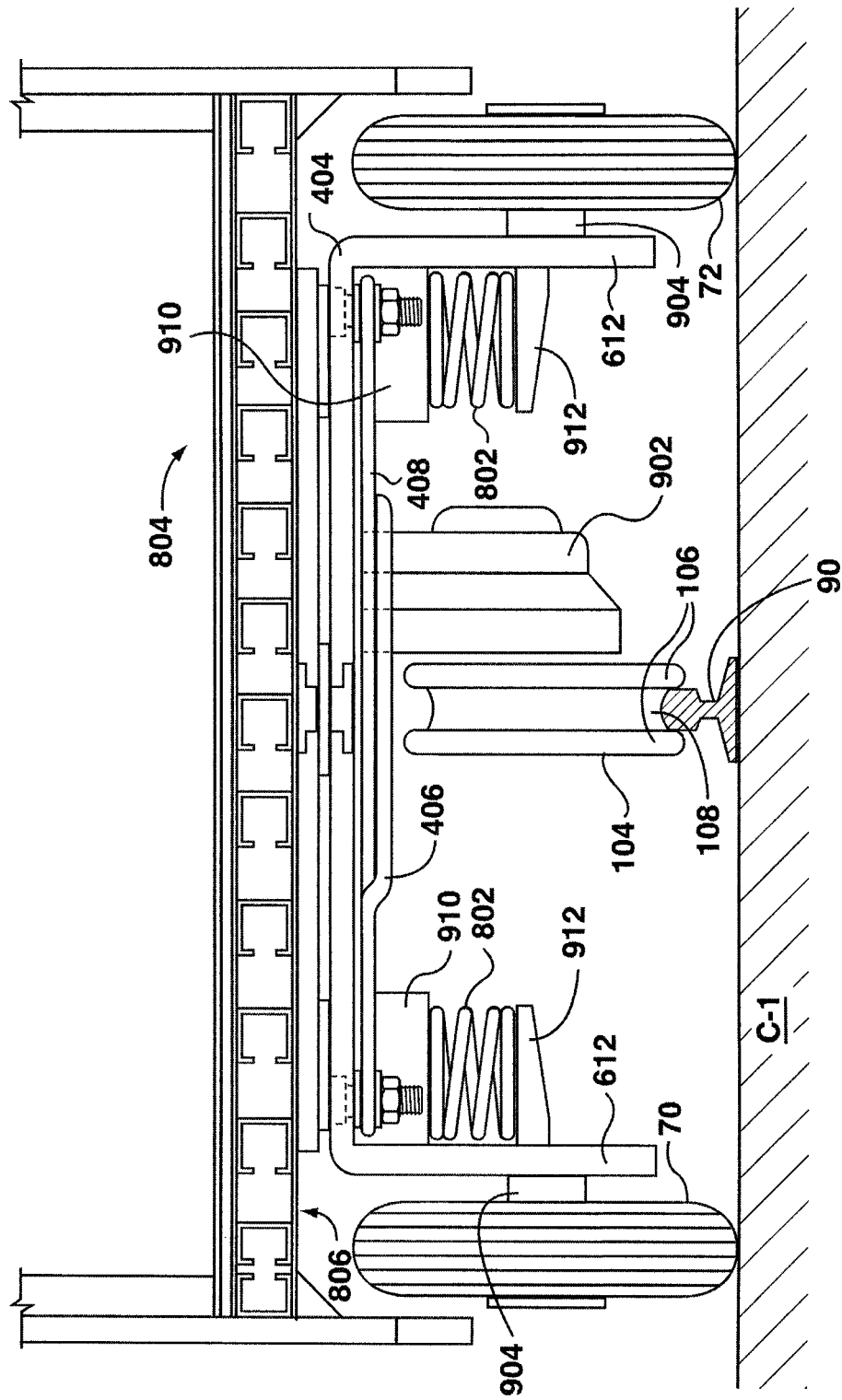
FIG. 10 is an end view of a streetcar mounted on another alternate embodiment of a railway truck according to the present invention.

FIG. 10 shows a further embodiment in which the streetcar 804 is attached to the housing 404 and rests along the top surface 420 of the housing 404. Support ledges 912 extend inwards from each of the rotatable members 904 through the flanges 612. In this arrangement the rotatable members 904 and their accompanying flanges are vertically slidable relative to the flanges 612. of the housing 404. Extending downwards from the underside 806 of the streetcar 804 are two suspension blocks 910. Coil springs 802 rest on each of the two support ledges 912 and extend upwards to engage with the suspension blocks 910. The coil springs 802 act between the support ledges 912 and suspension blocks 910.

Although not illustrated, a streetcar or other railcar structure may be mounted to the railway truck arrangement in FIG. 1-3 for example by mounting a bearing member midway along the first member 100 which supports the railcar structure or body and enables the railway truck 20 to swivel about an axis generally orthogonal to that of the axles 74.

Figure 11:
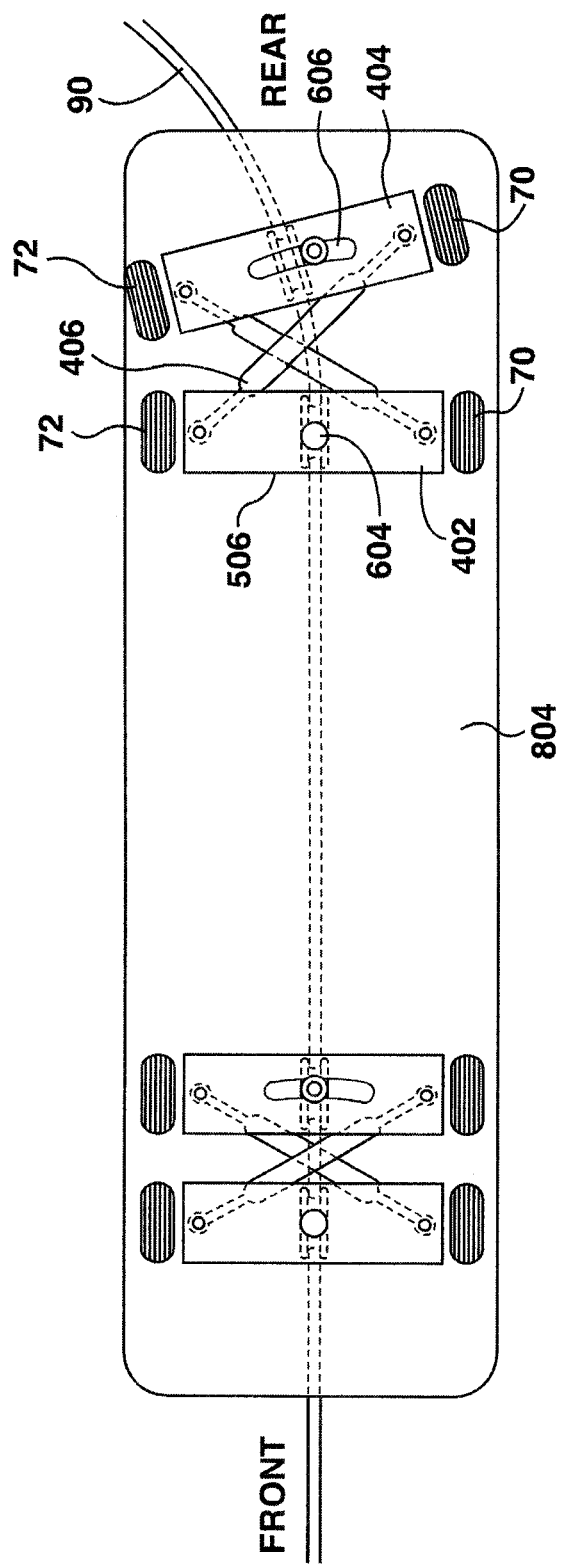
FIG. 11 is a plan view of the outline of a streetcar mounted on two railway trucks according to the present invention.
Figure 13:
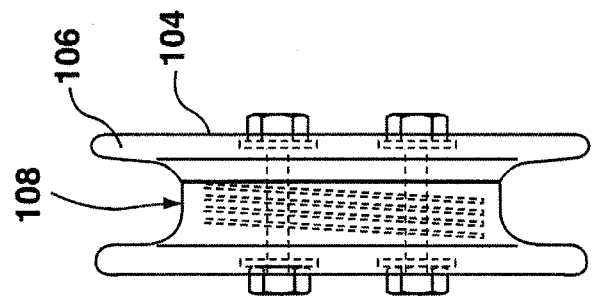
FIG. 13 is an end view of an assembled guiding wheel.

As shown in FIG. 11, one pair of wheelsets (i.e. a first wheelset 30 and second wheelset 50 together) may be attached underneath the rear of the streetcar 804 and a second pair of wheelsets may be attached underneath the front of the streetcar 804. The streetcar 804 in FIG. 11 is indicated only by its outline.

The extended aperture 606 allows the attachment element 810 extending from the underside 806 of the streetcar 804 to slide relative to the housing 404 (and hence the second wheelset 50) which allows the second wheelset 50 to pivot independently of the first wheelset 30. The guide wheel 104 can therefore remain riding on the monorail 90 while the monorail curves (as shown at the rear in FIG. 11).

Figure 12:
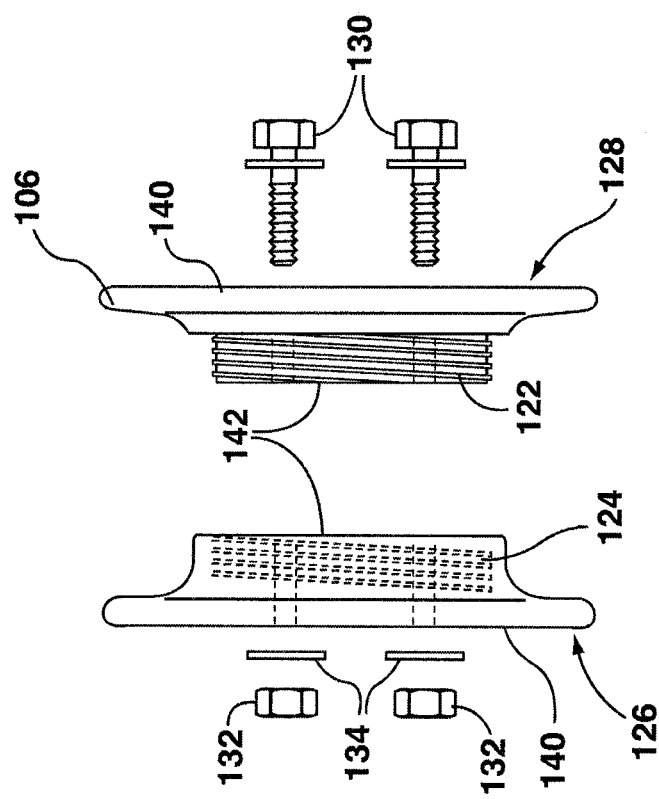
FIG. 12 is an exploded view of a guiding wheel in the present invention.

Referring to FIG. 12, the guiding wheel 104 comprises a first railway wheel 126 and a second railway wheel 128. At least one of the railway wheels 126, 128 has a track engaging surface extending circumferentially thereabout between a flanged face 140 and a non-flanged face 142. The first and second railway wheels 126, 128 join at their non-flanged faces 142 to define a channel for receiving and riding on a monorail track 90 with the flanges 106 engaging opposite sides of the monorail track 90 to maintain the track engaging surface on the monorail track 90.

In the embodiment shown in FIG. 12, the second railway wheel 128 has a circumferential flange 106 surrounding an externally threaded portion 122. The first railway wheel 126 portion has a similar circumferential flange 106 surrounding an internally threaded portion 124. The externally threaded portion 122 of the second railway wheel 128 is received by the internally threaded portion of the first railway wheel 126 portion to form the guiding wheel 104. Two screws 130 and corresponding bolts 132 and washers 134 secure the second railway wheel 128 portion to the first railway wheel 126.

It will be appreciated that the above arrangement maintains the axis 82 of the wheelset generally orthogonal (at right angles when viewed from above) to the monorail track 90.

The monorail system is easy to install in situations where a smooth surface is available for the tires to ride on. In situations where railroad ties are used for track support, a suitable pad may be secured to an upper face of the ties on either side of the monorail track to provide a riding surface for the left and right wheels.

Although specific embodiments of the invention have been described herein, it will be understood by those skilled in the art that variations may be made thereto without departing from the spirit of the invention or the scope of the appended claims. For example, although the presently preferred embodiment is described with respect to a monorail system, it is expected that the arrangement may be adapted to parallel rail systems by eliminating the central guidewheel and utilizing conventional railway wheels for engaging the rails.

What is claimed is the following:

1. A railway truck for pivotably supporting a railway car comprising:

first and second wheelsets each comprising at least a left and a right wheel adjacent opposite ends of an axle, said left and rights wheels of said first and second wheelsets respectively being alignable to follow a common path;

each said axle being supported for rotation about an axle axis thereof by a respective bearing adjacent each said left and right wheel, each said bearing being supported in a respective bearing support;

a first frame member extending between said bearing support adjacent said left wheel of said first wheelset and said bearing support adjacent right wheel of said second wheelset, said first frame member being swivelably coupled to said bearing supports for rotation about an axis orthogonal to said axle axis;

a second frame member extending between said bearing support adjacent said left wheel of said second wheelset and said bearing support adjacent said right wheel of said first wheelset, said second frame member being swivelably coupled to said bearing supports for rotation about an axis orthogonal to said axle axis;

said first and second frame members being free to move without interference from each other to cause said left and right wheels respectively to move toward or away from each other in response to movement in the opposite direction by the other of said left and right wheels to cause said truck to steer in response to a change in a rolling direction of either of said first and second wheelsets; and one of said first and second frame members having support means thereon for pivotably supporting said railway car.

2. The railway truck according to claim 1 further having a bearing supported by one of said first and second frame members for supporting a portion of an overlying rail car.

3. The railway truck according to claim 2 wherein each of said first and second wheelsets has a middle wheel mounted to said axle midway between said left and right wheels, said middle wheel being a rail engaging wheel, said left and right wheels being road engaging wheels;

said rail engaging wheel being configured to straddle a monorail track to guide said wheelsets and in turn to guide said railway truck.

4. The railway truck according to claim 3 wherein the rail engaging wheel has a diameter which is as great or greater than the diameter of said left and right wheels to engage said monorail track when said track is at least partially embedded in a road surface.

5. The railway truck according to claim 3 wherein at least one of said first and second frame members is contoured to allow a crossover of said first and second frame members without interference therebetween.

6. The railway truck according to claim 3 wherein said left and right wheels comprise a rim shod with a rubber tire.

7. The railway truck according to claim 3 wherein said rail engaging wheel comprises a pair of railway wheels each having a track engaging surface extending circumferentially thereabout between a flanged face and a non-flanged face joined at said non-flanged face to define a channel for receiving and riding on said monorail track with said flanges engaging opposite sides of said monorail track to maintain said track engaging surface on said monorail track.

8. A streetcar comprising:

a railway truck according to claim 3 at opposite ends thereof;

a streetcar body pivotably supported by said railway trucks;

at least one motor coupled to at least one of said wheelsets for driving said wheelset;

motor control means communicating with said motor for controlling said driving of said wheelset by said motor; and a power receptor mounted to said streetcar for receiving electricity from a source of electricity, said power receptor being electrically coupled to said at least one motor through said motor control means.

\* \* \* \* \*